(12) United States Patent
Riza

(10) Patent No.: US 6,922,233 B2
(45) Date of Patent: Jul. 26, 2005

(54) DIGITAL OPTICAL BEAM PROFILER

(75) Inventor: Nabeel Agha Riza, Oviedo, FL (US)

(73) Assignee: Nuonics, Inc., Winter Park, FL (US)

( * ) Notice: Subject to any disclaimer, the term of this patent is extended or adjusted under 35 U.S.C. 154(b) by 357 days.

(21) Appl. No.: 10/360,037

(22) Filed: Feb. 7, 2003

(65) Prior Publication Data

US 2003/0174314 A1 Sep. 18, 2003

Related U.S. Application Data

(60) Provisional application No. 60/408,830, filed on Sep. 6, 2002, and provisional application No. 60/355,658, filed on Feb. 8, 2002.

(51) Int. Cl.$^7$ .................................................. G01J 1/00
(52) U.S. Cl. ...................................................... 356/121
(58) Field of Search ................................... 356/121–122

(56) References Cited

U.S. PATENT DOCUMENTS 3,617,755 A    11/1971  Arnaud
5,064,284 A    11/1991  Johnston, Jr. et al.

*Primary Examiner*—Gregory J. Toatley, Jr.
*Assistant Examiner*—Amanda Merlino
(74) *Attorney, Agent, or Firm*—James H. Beusse; Buesse Brownlee Wolter Mora & Maire, P.A.

(57) ABSTRACT

An optical beam profiler using a spatial light modulator and photodetector. In an embodiment, the spatial light modulator is a two-dimensional (2-D) small tilt digital micromirror device. The profiler features fast speed, digital controls, low polarization sensitivity, and high measurement repeatability. The 2-D multi-pixel device-based profiler allows the use of several beam profile measurement concepts including moving knife edge, scanning slit, moving pinhole, variable aperture, and 2-D photodiode array. The proposed digital optical beam profiler can be implemented with any type of digitally operated 2-D spatial light modulator device such as using liquid crystals, magneto-optics, multiple quantum wells, electro-optic polymers, and photonic crystals.

15 Claims, 2 Drawing Sheets

DIGITAL OPTICAL BEAM PROFILER

SPECIFIC DATA RELATED TO INVENTION

This application claims the benefit of U.S. Provisional Patent Application No. 60/355,658 filed Feb. 8, 2002, and U.S. Provisional Patent Application No. 60/408,830 filed Sep. 6, 2002, incorporated herein by reference.

BACKGROUND OF THE INVENTION

1. Field of the Invention

The present invention is generally related to optical beam profile measurement systems, and, specifically, to a digital optical beam profiler using a spatial light modulator.

2. Related Art

Since the invention of laser in the 1960s, lasers have been used extensively in a variety of applications ranging from laser research, optical communications, and material processing to optical metrology. In these applications, it is very important to know the parameters that can describe the laser beam. Optical beam radius is one of these parameters and it is defined as the distance between the maximum optical power or intensity point of the optical beam and the position where the optical beam intensity is reduced by a factor of 1/exp(2). Another important parameter is the optical beam waist position along the laser beam. Over the past decades, several techniques involving moving mechanical elements have been proposed and experimentally demonstrated to determine, or "profile," the optical beam, including measuring the optical beam radius and the optical beam profile, or shape and position of an optical beam cross section. Such profiling techniques include the use of a one dimensional (1-D) moving knife edge, see J. A. Arnaud and C. Neck, Apparatus for locating and measuring the beam-waist radius of a Gaussian laser beam, U.S. Pat. No. 3,617,755, issued Nov. 2, 1971; J. A. Arnaud, et. al., *Technique for Fast Measurement of Gaussian Laser Beam Parameters,* APPLIED OPTICS, Vol. 10, No. 12, 2775–2776, (December 1971), a 2-D moving knife edge, see T. F. Johnston and G. H. Williams, Apparatus for Measuring the Mode Quality of a Laser Beam, U.S. Pat. No. 5,064,284, issued Nov. 12, 1991; a translating pinhole, see P. J. Shayler, *Laser Beam Distribution in the Focal Region,* APPLIED OPTICS, Vol. 17, No. 17, 2673–2674, (September 1978); an encircled energy principle via a variable aperture, see P. J. Brannon, et. al., *Laser Focal Spot Measurements,* JOURNAL OF APPLIED PHYSICS, Vol. 46, No. 8, 3576–3579, (August 1975), a scanning slit, see M. K. Giles and E. M. Kim, *Linear Systems Approach to Fiber Characterization Using Beam Profile Measurements,* SPIE CONFERENCE ON FIBER OPTICS: SHORT-HAUL AND LONG-HAUL MEASUREMENTS AND APPLICATIONS, Vol. 500, 67–70, (August 1984), and a rotating mirror to scan the laser beam across a photodetector, see C. P. Wang, *Measuring 2-D Laser-beam Phase and Intensity Profiles: A New Technique,* APPLIED OPTICS, Vol. 23, No. 9, 1399–1402, (May 1984), all of which are incorporated herein by reference.

Other optical beam profile measurements were also demonstrated including methods based on multiphoton ionization effect, see E. H. A. Granneman and M. J. van der Wiel, *Laser Beam Waist Determination by Means of Multiphoton Ionization,* REVIEW OF SCIENTIFIC INSTRUMENTS, Vol. 46, No. 3, 332–334, (March 1975) fluorescence correlation spectroscopy, see S. M. Sorscher and M. P. Klein, *Profile of a Focused Collimated Laser Beam Near the Focal Minimum Characterized by Fluorescence Correlation Spectroscopy,* REVIEW OF SCIENTIFIC INSTRUMENTS, Vol. 51, No. 1, 98–102, (January 1980), 2-D photodiode array, see J. T. Knudtson and K. L. Ratzlaff, *Laser Beam Spatial Profile Analysis Using a Two-dimensional Photodiode Array,* REVIEW OF SCIENTIFIC INSTRUMENTS, Vol. 54, No. 7, 856–860, (July 1983), photo-thermal deflection, see A. Rose, Y. -X. Nie, and R. Gupta, *Laser Beam Profile Measurement by Photothermal Deflection Technique,* APPLIED OPTICS, Vol. 25, No. 11, 1738–1741, (June 1986), and thermographic instrument, see T. Baba, T. Arai, and A. Ono, *Laser Beam Profile Measurement by a Thermographic Technique,* REVIEW OF SCIENTIFIC INSTRUMENTS, Vol. 57, No. 11, 2739–2742, (November 1986), all of which are incorporated herein by reference.

However, some limiting factors such as wavelength sensitivity in multiphoton ionization method, the need of a dilute solution in fluorescence correlation spectroscopy technique, and the requirement to use a high power pulse laser for thermal graphic techniques are the reasons that have propelled the simpler moving mechanical element and the 2-D photodiode array approaches to being commercially dominant. These common mechanical scanning methods use scanning elements that are moved in an analog fashion and therefore require precise analog voltage control that adds cost and complexity to the optical beam profilers. Furthermore, hysteresis and motion sensitivity limits in mechanical elements reduce profiler measurement repeatability. Hence, it would be highly desirable to digitally control the motion of the scanning elements.

SUMMARY DESCRIPTION OF THE INVENTION

It is an object of this invention to introduce a digitally controlled optical beam profiler that uses a spatial light modulator. In an aspect of the invention, the spatial light modulator includes an array of 2-D small tilt micromirrors. This small tilt micromirror device is based on the mature microelectromechanical system (MEMS) technology that offers low cost, compact mechanical elements with low electrical analog/digital drive control via the use of low cost batch fabrication techniques similar to semiconductor electronic chip production methods. The profiler incorporates the basic principles of a 2-D photodetector array and mechanical scanning techniques via a 2-D MEMS device, leading to the implementation of an all-digital control profiler that has the ability to digitally replicate the moving mechanical elements of conventional optical profilers. In addition, cooperation between the array of 2-D small tilt micromirrors and a high sensitivity photodetector inherently forms the 2-D photodetector array-based optical beam profiler. Other advantages of exploiting a 2-D micromirror array are low polarization sensitivity, broadband wavelength operation, profiler fault-tolerance to individual mirror failure, and high measurement repeatability. In general, any 2-D multi-pixel transmissive/reflective/absorptive device can be used in the proposed optical beam profiler.

DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
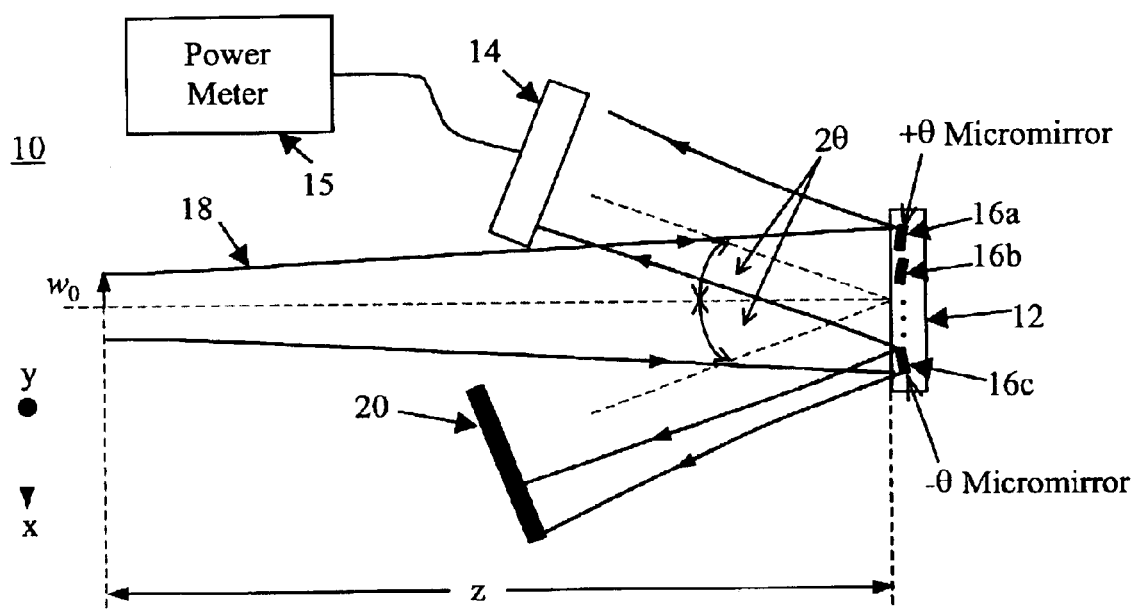
FIG. 1 shows the basic structure of an embodiment of the invention implemented as a MEMS-based digitally controlled optical beam profiler using a two-dimensional (2-D) small tilt micromirror device.

In general, the invention includes a programmable spatial light modulator for selectively directing light from an incident optical beam and a photodetector for detecting an intensity of the light directed by the spatial light modulator. The basic structure of an embodiment implemented as a digitally controlled MEMS-based optical beam profiler 10 is shown in FIG. 1. In an aspect of the invention, the beam profiler 10 uses a 2-D small tilt micromirror device 12 and a 2-D photodetector 14. Each micromirror 16a, 16b, and 16c, of the micromirror device 12 may have two states of operation: +θ and −θ mirror positions. As seen in FIG. 1, when the desired micromirrors are set to +θ position (for example, as shown by the angular position of micromirrors 16a and 16b) the corresponding part of the optical beam 18 is reflected to the photodetector 14 and the power of detected light can be measured by a power meter 15. In another aspect, the optical beam 18 can be directed to an absorber 20 when the specified micromirrors are set to the −θ position (for example, as shown by the angular position of micromirror 16c). In an embodiment, each micromirror 16a, 16b, and 16c, is individually controllable and can correspond to one pixel of the 2-D photodetector 14. Hence, in an aspect of the invention, a 2-D photodiode array-based optical beam profiler 10 is formed. In addition, because the micromirrors 16a, 16b, and 16c are arranged in 2-D space and the desired micromirrors can be tilted to the +θ or −θ mirror position, the motion of mechanical elements used in conventional beam profiling techniques, such as a moving knife edge, a scanning slit, a scanning pinhole, and a variable aperture can be digitally performed. In a further aspect of the invention, the resolution of the optical beam profile measurement is determined by the pixel size, i.e., the size of the micromirrors, such as 16a, 16b, 16c, and the gap between adjacent micromirrors.

In an embodiment, the digital optical beam profiler can use a VGA format design 2-D digital micromirror device (DMD) available, for example, from Texas Instrument Corporation, as the 2-D small tilt micromirror device used in the optical beam profiler structure. See R. L. Knipe, *Challenges of a Digital Micromirror Device™: Modeling and Design*, PROCEEDINGS OF SPIE, Vol. 2783, 135–145, (1996). For example, the key features and specifications of a 2-D DMD may be as follows: the size of each micromirror in the array is 16 μm×16 μm and the gap between adjacent mirrors is 1-μm. The device optical efficiency for the visible light region is approximately 62%, limited by the fill factor, the mirror reflectivity, and the device diffraction effect. Each micromirror can be set to tilt at +10° or −10° in a response time of 15 μs.

The above described 2-D DMD has recently been used to implement fiber-optic beam control modules for use in wavelength division multiplexed (WDM) light wave systems. See N. A. Riza and S. Sumriddetchkajorn, *"Digitally Controlled Fault-tolerant Multi-wavelength Programmable Fiber-optic Attenuator using a Two-Dimensional Digital Micromirror Device,"* OPT. LETTERS. 24, 282–284, (Mar. 1, 1999) and N. A. Riza, Fault-tolerant Fiber-optical Beam Control Modules, U.S. Pat. No. 6,222,954, issued Apr. 24, 2001. Here, the DMD is coupled with fiber-optics to create a variable optical attenuator (VOA). Variable optical attenuation is provided by digitally changing the tilt settings of the many mirrors on the DMD to direct light into or away from fiber-optics so that the light entering the fiber-optics is controlled in power.

In the proposed invention, using the same basic structure of mirror device and optical receiver, calculating the unknown beam profile by measuring the power received on a photoreceiver, or photodetector array, can be accomplished. For a VOA, the optical beam profile is known, and hence a given attenuation generation can be produced by controlling the appropriate number, location, and position of the micromirrors. Hence, by using a simple and novel application of a conventional VOA optical system techniques, a spatial light modulator, such as a DMD, based digital profiler for optical beams can be realized.

Figure 2A:
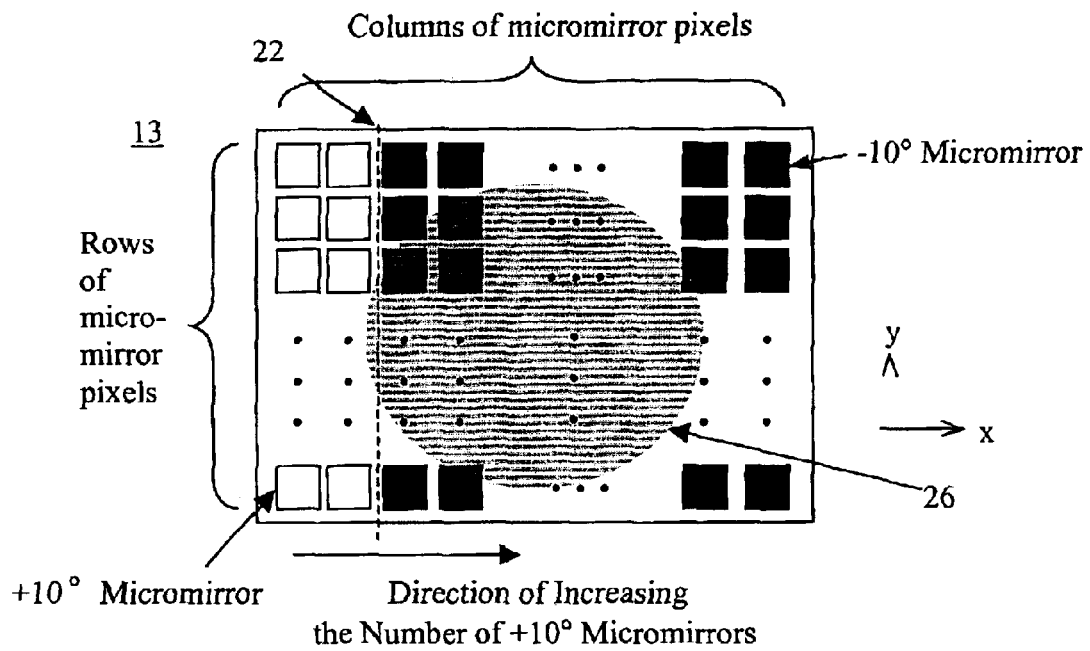
FIG. 2A depicts the working principles of an embodiment of the digital beam profiler simulating a 2-D knife edge optical beam profiling method translating in an x axis mode.
Figure 2B:
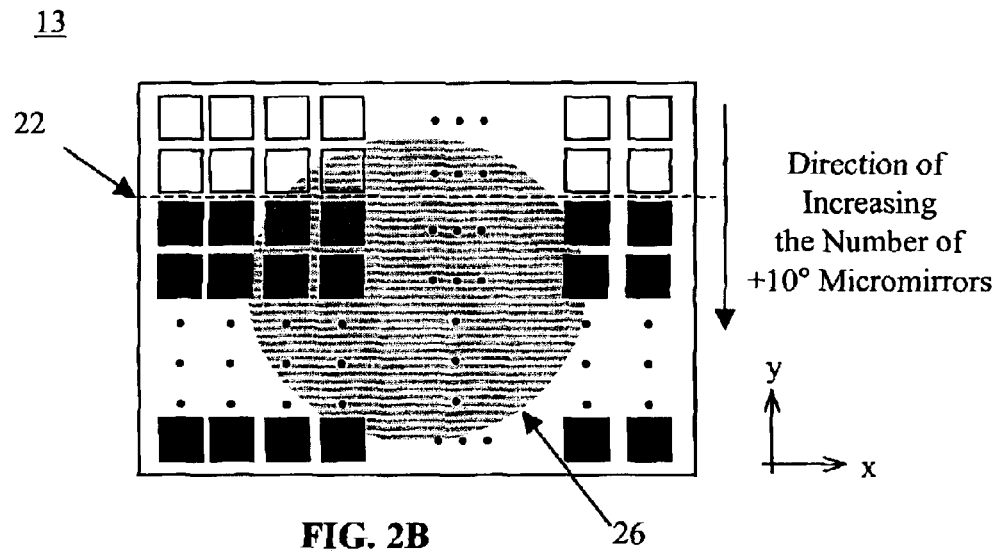
FIG. 2B depicts the working principles of an embodiment of the digital beam profiler simulating a 2-D knife edge optical beam profiling method translating in an y axis mode.

Referring now to the embodiments depicted in FIGS. 2A and 2B, the procedure for digitally implementing a 2-D moving knife edge (conventionally performed using mechanical arrangements) via a 2-D DMD digital beam profiler, is described. First, all micromirrors (depicted as square symbols in FIGS. 2A and 2B) in the 2-D DMD 13 are set to the −10° position (depicted as blank squares in FIGS. 2A and 2B) so that an optical beam having an optical beam cross section 26 incident on the 2-D DMD 13 is reflected, for example to an absorber 20 as shown in FIG. 1. Then, a simulated vertical knife edge 22 is produced by sequentially changing the orientation of a linear set, such as a column, of micromirrors in a 2-D DMD 13 from the −10° position to a +10° position so that a portion of the optical beam cross section 26 incident on the column of micromirrors oriented in the +10° position reflect light to a photodetector 14 as in FIG. 1. In this example, sequentially means on a column-by-column basis. In one aspect, after a respective column has been reoriented from a −10° position to a +10° position, the respective column remains in the +10° position, as successive columns are sequentially reoriented. For example, after the columns in the 2-D DMD 13 have initially been set to the −10° position, a first column at a left side of the 2-D DMD 13 is set to the +10° position. Then, a second column adjacent to the first column is reoriented to the +10° position, while the first column remains in the +10° position. Next, a third column, adjacent to the second column is reoriented to the +10° position, while the first column and second columns remain in the +10° position. This process is repeated until reaching a last column on the right side of the 2-D DMD 13. Accordingly, the optical beam cross section 26 is horizontally scanned along an x-axis by sequentially reflecting portions of the optical beam to the photodetector, where the power level of the respective portions of the reflected light can be measured.

Similarly, as shown in FIG. 2B, the optical beam cross section 26 can be vertically scanned along a y-axis using the technique of sequentially changing the orientation of a linear set, such as a row, of micromirrors in a 2-D DMD 13 from the −10° position to the +10° position. In this example, sequentially means on a row-by-row basis. Accordingly, a horizontal knife edge 24 is simulated as vertically moving through the optical beam cross section 26 to selective reflect portions of the optical beam to the photodetector.

In both cases, the position of the simulated knife edge 24, 26 is equal to Nd, where N is the number of columns or rows containing the +10° micromirrors and d is the pixel size (e.g., 16-μm for TI 2-D DMD). By correlating the respective commanded pixels of the 2-D DMD 13 with a respective detected power of each potion of incident light correspondingly reflected to the photodetector; and processing all the correlated detected powers for a scan of an optical beam cross section, an optical beam profile of the incident optical beam can be determined. For example, curve fitting, as known in the art, can be employed to determine respective parameters of the received optical beam, such as beam radii in the x and y directions.

A MEMS-based optical beam profile measurement method has been described that uses an array of 2-D small tilt micromirrors. This digital profiler approach has opened up the important possibility of performing several moving mechanical element-based beam profiling techniques. The combination of the 2-D small tilt micromirror array and a photodetector inherently forms a 2-D photodetector array-based optical beam profiler. Key features of the proposed profiler include fast speed, digital control, high measurement repeatability, low polarization sensitivity, fault-tolerance, and broadband wavelength operation via 2-D micromirror arrangement and mirror binary operation. Other 2-D pixel array devices such as a liquid crystal-based 90° polarization rotator device sandwiched between cross polarizers can also be exploited for this profiler for optical beams whose polarization direction is known. Still other spatial light modulator technologies may be used, including magneto-optics, multiple quantum wells, electro-optic polymers, and photonic crystals. Both optically and electrically addressed spatial light modulation devices can be employed to realize the proposed digital optical beam profiler. In addition, other scanning techniques may be employed by controlling individual pixels of a spatial light modulator. For example, single pixels or groups of pixels may be commanded to direct light to a photodetector to create a pixel map of an optical beam cross section. Furthermore, the photodetector may comprise a number and pattern of photodetector elements that corresponds to the number and pattern of the pixels in the spatial light modulator, so that a one-to-one correspondence between a respective spatial light modulator pixel and a photodetector element may be used.

What is claimed is:

1. An optical beam profiler, comprising:
    a programmable spatial light modulator for selectively directing light from an incident optical beam;
    a photodetector for detecting a power of light directed by the spatial light modulator;
    and a processor configured to correlate a selection of light directed by the programmable light modulator with a respective power detected by the photodetector and process a plurality of correlated detected powers to determine an optical beam profile of the incident optical beam.

2. The optical beam profiler of claim 1, further comprising a power meter for measuring a detected power of light at the photodetector.

3. The optical beam profiler of claim 1, wherein the programmable spatial light modulator is configured to simulate a knife edge passing through a cross section of the incident optical beam.

4. The optical beam profiler of claim 1, wherein the programmable spatial light modulator is configured to simulate a moving slit, a pin hole, or a variable aperture passing through a cross section of the beam.

5. The optical beam profiler of claim 1, wherein the photodetector further comprises detector element corresponding to pixels in the spatial light modulator.

6. The optical beam profiler of claim 1, wherein the spatial light modulator comprises a reflective device for selectively reflecting light.

7. The optical beam profiler of claim 1, wherein the spatial light modulator comprises a digital micromirror device comprising a plurality of individually programmable micromirrors.

8. The optical beam profiler of claim 1, wherein the spatial light modulator comprises a liquid crystal device for selectively transmitting light.

9. The optical beam profiler of claim 8, wherein the LCD device comprises a polarization device.

10. A method of profiling an optical beam comprising:
    commanding pixels of a spatial light modulator to direct respective portions of an incident light beam to a photodetector;
    detecting a respective power of each portion of incident light directed to the photodetector;
    correlating the respective commanded pixels of the spatial light modulator with a respective detected power of each portion of incident light; and
    processing correlated detected powers to determine an optical beam profile of the incident optical beam.

11. The method of claim 10, further comprising simulating a knife edge passing through a cross section of the incident optical beam.

12. The method of claim 10, further comprising simulating a moving slit, a pin hole, or a variable aperture passing through a cross section of the beam.

13. The method of claim 10, further comprising sequentially commanding respective linear sets of pixels of the spatial light modulator to direct respective portions to a photodetector in a first planar direction.

14. The method of claim 10, further comprising sequentially commanding respective linear sets of pixels of the spatial light modulator to direct respective portions to a photodetector in a second planar direction orthogonal to a first planar direction.

15. A method of claim 11, further comprising:
    sequentially commanding respective linear sets of pixels of the spatial light modulator to direct respective portions of the optical beam to the photodetector.

* * * * *